UNITED STATES PATENT OFFICE.

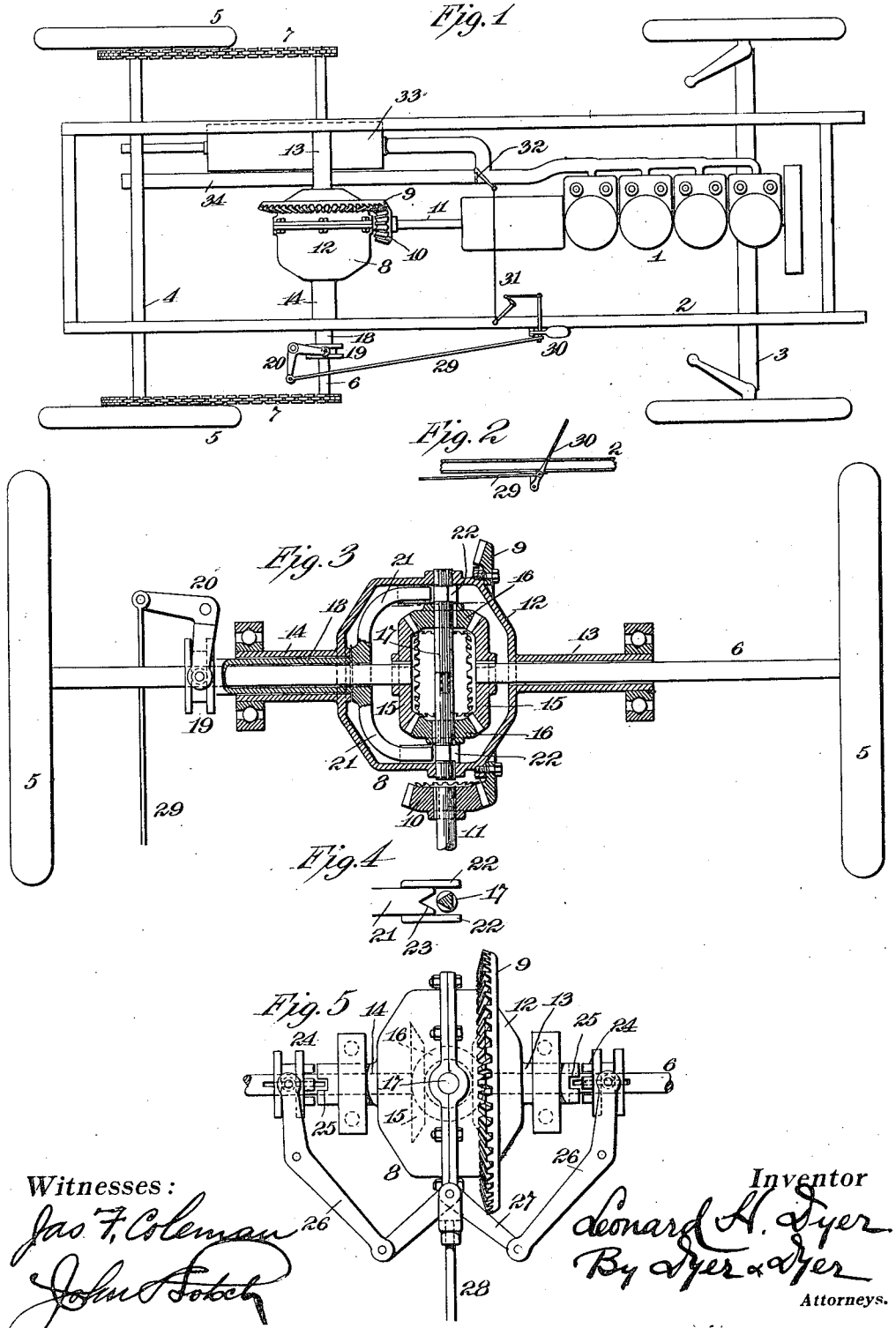

LEONARD H. DYER, OF GREENWICH, CONNECTICUT, ASSIGNOR TO ENTERPRIZE AUTOMOBILE COMPANY, OF HOBOKEN, NEW JERSEY, A CORPORATION OF NEW JERSEY.

MOTOR-VEHICLE.

1,125,079.  Specification of Letters Patent.  Patented Jan. 19, 1915.

Application filed May 23, 1908. Serial No. 434,505.

*To all whom it may concern:*

Be it known that I, LEONARD H. DYER, a citizen of the United States, and a resident of the town of Greenwich, county of Fairfield, and State of Connecticut, have invented an Improvement in Motor-Vehicles, of which the following is a specification.

The object I have in view is the production of a motor vehicle which will have an increased traction effect, by means of which both driving wheels may be equally driven, at the will of the operator, and in which the propelling force may be equalized upon the wheels, when so desired.

Another object is to produce a vehicle which may have the maximum speed.

These and further objects will appear from the following specification and accompanying drawings, considered together or separately.

Figure 1 is a plan view of a portion of a chassis of a motor vehicle showing one embodiment of my invention. Fig. 2 is a detail of a portion of the structure shown in Fig. 1. Fig. 3 is an enlarged view of the structure illustrated in Fig. 1, the jack shaft in this instance being the driving axle. Fig. 4 is a detail of the structure shown in Fig. 3; and Fig. 5 is a modification.

In all of the views like parts are designated by the same reference characters.

In carrying out my invention I provide a motor 1, which may be any form of prime mover. In the embodiment illustrated, an internal combustion engine is shown. This motor is supported upon a frame 2, which in turn is supported upon a steering axle 3 and a driving axle 4, both axles having wheels, as shown. The driving wheels 5 are shown as connected to the jack shaft 6 by means of side chains 7—7, in the usual manner. The jack shaft 6 carries a differential 8, which is rotated by means of the bevel gear 9. This bevel gear engages with the bevel pinion 10, which is carried on the longitudinal shaft 11, such longitudinal shaft being driven by the motor 1. The structure described is the ordinary arrangement almost universally used with motor vehicles, and may be modified in any well known manner.

My invention comprehends a means for locking or disengaging the differential at the will of the operator so that both of the driving wheels may turn together and may be equally driven. One means for disengaging or locking the differential is illustrated in Fig. 3. This means is the same as that illustrated in Fig. 1, except that the jack shaft in this case is the driving axle. The differential is provided with the ordinary gear case 12, which is carried concentrically around the jack shaft by means of sleeves 13 and 14, and connects the two parts of the jack shaft. The joint of the two parts of the jack shaft is coincident with the differential as in the well known manner, and each part is provided with a bevel gear 15. These bevel gears intermesh with bevel pinions 16—16, which are carried upon and turn with a cross shaft 17. The bevel gears and the bevel pinions are locked to their respective supporting shafts. The parted cross shaft turns on its own axis only when the driving wheels 5—5 do not turn at the same speed. When the two wheels turn at the same speed the parted cross shaft does not turn in its bearings. It is apparent therefore that if the parted cross shaft be locked against rotation the two driving wheels 5—5 will turn together at the same speed. One means which I have devised for locking the parted cross shaft comprises a clutch mounted upon a sleeve 18. The sleeve 18 surrounds one part of the jack shaft and lies within the sleeve 14; it is longer than the sleeve 14, so that a portion extends outside of the sleeve and is provided with the ordinary double rings 19 which engage with a shifting lever 20, and by means of which the sleeve 18 may be slid longitudinally upon the jack shaft 6. The sleeve 18 extends into the gear case 12 and carries upon its inner end the arms 21—21. These arms extend to the outer inner wall of the casing and move between guides 22 (Fig. 4). A portion of the parted cross shaft 17 in the path of the arm is made of non-circular cross section, shown in Fig. 4 as a triangular cross section. The ends of the arms are provided with notches 23 of the same shape as the cross section of the ends of the shaft.

By moving the sleeve 18 along the jack shaft the notches 23 will be brought into engagement with the non-circular ends of the parted cross shaft 17. This engagement will effectively prevent the rotation of such parted cross shaft, and will lock the differential, which will amount to the same as throwing it out of gear. When the differential is locked, the motor 1 will turn both the driving wheels with equal force.

Fig. 5 shows a modified means for locking the differential. In this modification the casing 12 is locked to and prevented from rotating in relation with the jack shaft 6. It is apparent that the differential will be locked if either part of the jack shaft be prevented from having relative movement with the differential casing. For the purpose of strength, however, I prefer to lock both parts of the jack shaft, as shown in Fig. 5.

The means for locking the parts together comprise clutches 24, which engage with the clutch notches 25, formed in the sleeves 13 and 14. The clutches 24—24 are moved into engagement with the clutch notches by means of the bell crank levers 26—26. The free ends of these levers are connected together by a toggle 27, which is actuated by a rod 28. This rod 28 being pulled in the direction opposite to the differential will separate the bell crank levers 26 and will apply both clutches 24—24. It is apparent that only one clutch need be used, if such is desired, and at the same time the entire differential will be locked.

Referring to Fig. 1, the shifting lever 20 may be connected by a rod 29, with a pedal 30, which is conveniently within reach of the operator's foot. By pressing upon this pedal 30, which may be connected to any other form of differential locking mechanism, in addition to those described, the differential will be locked, and the desirable double driving feature of the two driving wheels will be secured.

By my invention the differential may be locked or unlocked at the will of the operator while the vehicle is running. The differential may be locked to secure increased speed or to secure traction on one of the wheels when the other is in a position to slip.

For the purpose of increasing the efficiency of the device, the pedal 30 may be connected by means of suitable connections, illustrated in Fig. 1, as a bell crank and rods 31 to a valve 32 arranged for cutting out the muffler 33. When the pedal is moved to lock the differential, the valve 32 will close the passage to the muffler and open it to the direct exhaust 34. The maximum effect of the motor will be secured at the same time that the maximum effect of the driving mechanism is attained, both effects being secured by mechanism operated at the same time. It is to be understood that this additional feature of cutting out the muffler may be omitted, if desired.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

A motor vehicle having a motor, drive wheels, a shaft for driving the wheels, a shaft connecting the motor and driving shaft, a differential in the driving shaft, a casing surrounding the differential, a bifurcated member having angular notches in its extremities for engaging angular portions on both sides of the cross member of the differential to lock the parts together, said bifurcated member being located within the casing but operable longitudinally of the driving shaft, from the outside thereof, and guides within the casing for positioning the notched ends of the bifurcated member to engage the cross member.

This specification signed and witnessed this 22nd day of May, 1908.

LEONARD H. DYER.

Witnesses:
JOHN L. LOTSCH,
WM. J. CASEY.